United States Patent [19]

Guggiari

[11] Patent Number: 5,265,955
[45] Date of Patent: Nov. 30, 1993

[54] MACHINE FOR THE EXTRUSION OF THERMOPLASTIC POLYMERS AND THE LIKE COMPRISING AN INTERNAL MIXER

[75] Inventor: Andrea Guggiari, Como, Italy

[73] Assignee: Pomini Farrel S.p.A., Castellanza, Italy

[21] Appl. No.: 856,536

[22] Filed: Mar. 24, 1992

[30] Foreign Application Priority Data

Apr. 15, 1991 [IT] Italy ............... MI91A 001030

[51] Int. Cl.$^5$ .............................. B01F 7/08
[52] U.S. Cl. ............................ 366/85; 366/88; 366/301; 366/323; 425/204; 425/205
[58] Field of Search .......... 366/76, 85, 88, 97, 366/297, 299-301, 323; 425/204, 205, 208

[56] References Cited

U.S. PATENT DOCUMENTS

| | | | |
|---|---|---|---|
| 3,070,836 | 1/1963 | De Haven et al. | 425/204 |
| 3,143,767 | 8/1964 | Wirth et al. | 366/85 |
| 3,305,894 | 2/1967 | Boden et al. | 366/85 |
| 3,501,807 | 3/1970 | Selbach | 425/204 |
| 3,575,382 | 4/1971 | Loomans | 366/301 |
| 3,711,067 | 1/1973 | Kovacs . | |
| 3,764,114 | 10/1973 | Ocker | 366/301 |
| 4,025,058 | 5/1977 | Mizuguchi | 425/204 |
| 4,073,013 | 2/1978 | Blach | 366/301 |
| 4,423,960 | 1/1984 | Anders | 366/88 |
| 4,534,652 | 8/1985 | Stade | 366/301 |
| 4,663,103 | 5/1987 | McCullough et al. | 366/88 |
| 4,744,669 | 5/1988 | Kowalczyk et al. | 366/301 |

FOREIGN PATENT DOCUMENTS

| | | |
|---|---|---|
| 0342839 | 11/1989 | European Pat. Off. . |
| 0364634 | 4/1990 | European Pat. Off. . |
| 391003 | 10/1990 | European Pat. Off. ............. 366/85 |
| 51-23987 | 7/1976 | Japan ................................. 425/204 |
| 2-034307 | 2/1990 | Japan ................................. 366/85 |
| 228921 | 2/1969 | U.S.S.R. ............................. 366/76 |
| 2163088 | 2/1986 | United Kingdom . |

OTHER PUBLICATIONS

Plastics Engineering 40(1984) Apr., No. 4, Brookfield Center, Conn. pp. 27 to 30 vol. 9., No. 124 (M-383) (1847) May 29, 1985.

Primary Examiner—Harvey C. Hornsby
Assistant Examiner—Mark Spisich
Attorney, Agent, or Firm—Herbert Dubno

[57] ABSTRACT

A machine for manufacturing thermoplastic polymers including a plurality of coaxial components adjacent to and made integral with one another, the components forming a longitudinal chamber receiving a pair of interacting shafts having portions correspondingly differentiated to provide sections for feeding and premixing the compound, thus forming a single assembly with coaxial components capable for carrying out full processing of the compound from the raw material to extrusion, without discontinuity of sequence.

2 Claims, 1 Drawing Sheet

U.S. Patent
Nov. 30, 1993
5,265,955
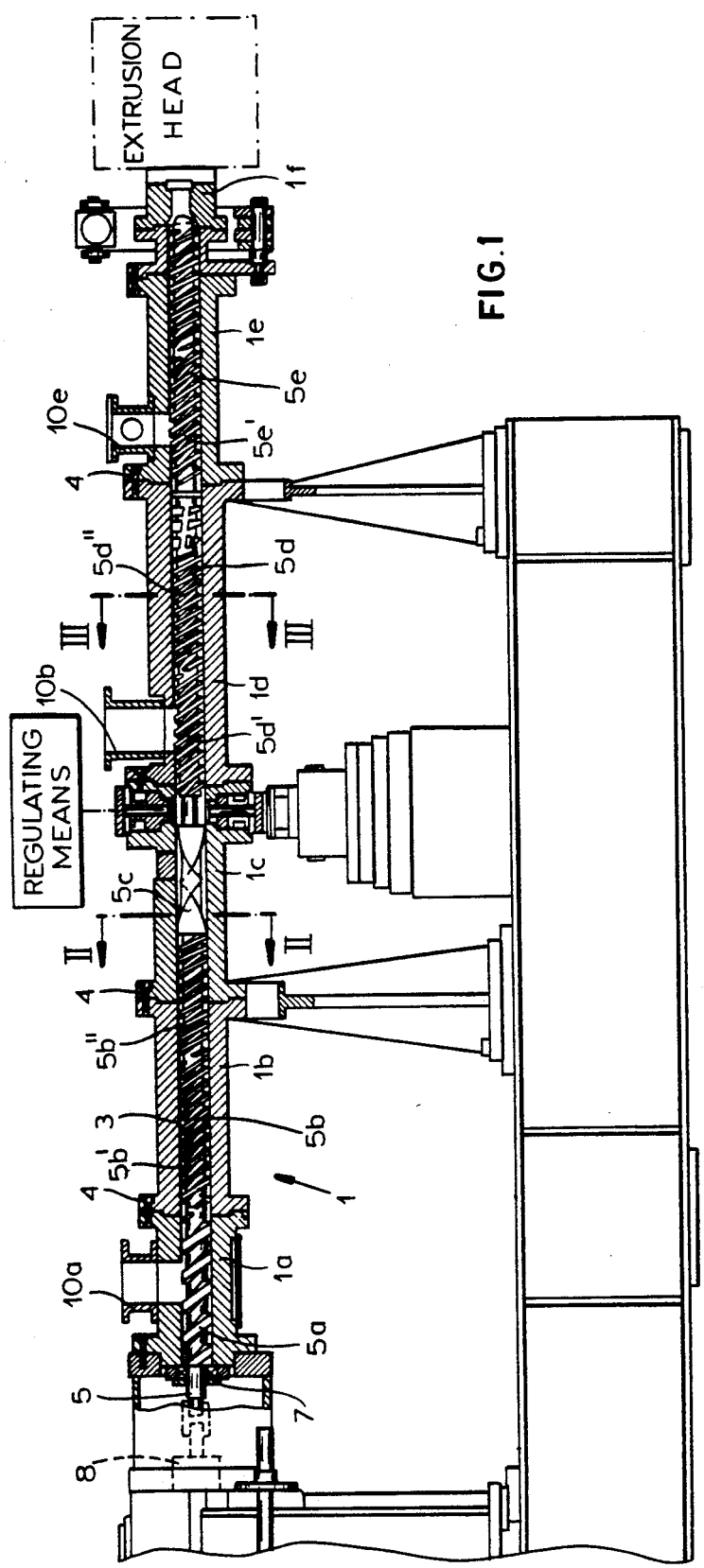
FIG.1
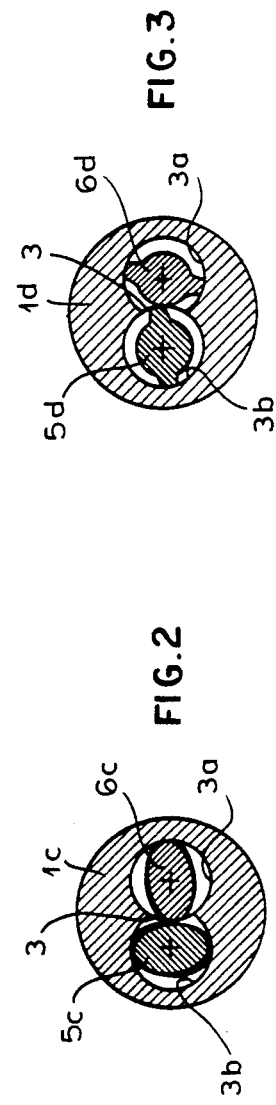
FIG.2
FIG.3

MACHINE FOR THE EXTRUSION OF THERMOPLASTIC POLYMERS AND THE LIKE COMPRISING AN INTERNAL MIXER

FIELD OF THE INVENTION

This invention relates to a machine for processing thermoplastic polymers comprising an extruder and an internal mixer capable of carrying out full processing of the product from the raw material to a final extrusion without discontinuity of sequence.

BACKGROUND OF THE INVENTION

It is known that the process for extruding thermoplastic polymers provides for an initial phase of preparation of the rubber according to the desired composition by mixing a base polymer which is filled with various additives to enhance certain features thereof in relation to others, thus bringing about various compositions of the compound suited to different uses.

The compound is subsequently extruded into the desired shapes to meet various needs.

These mixing and extrusion phases are commonly performed by individual machines, known as mixers and extruders respectively, which have certain technical features specific to the type of operation to performed. In particular it is required that the mixers be versatile and readily adaptable for mixing different compositions of the compound, and that they ensure control and regulation of the mixing temperature and high productivity.

It is also known that attempts have been made to perform the combined mixing and extrusion operation with extruders of the type provided with two parallel screw shafts acting together to achieve both feeding of the product and mixing thereof.

These machines, however, have numerous disadvantages, including low mixing capacity, particularly for certain types of compound filled with carbonates or talcs to improve the mechanical characteristics, lack of flexibility when changing the type of compound, low productivity and difficulty in controlling the temperature.

OBJECT OF THE INVENTION

It is therefore an object of the present invention to provide a machine which combines flexibility, adaptability and productivity of a mixer with the advantages of an extruder without requiring intermediate function units outside the machine.

SUMMARY OF THE INVENTION

This goal is attained by a machine for processing according to the invention which includes a multiplicity of coaxial components, adjacent to and made integral with one another so as to form a chamber extending lengthwise, within which is located a pair of interacting parallel shafts having correspondingly differentiated portions to provide sections for feeding and premixing the polymer. Interposed between these sections ia a machine section forming an internal mixer, and thus forming a single assembly with coaxial components capable of carrying out full processing of the compound from the raw material to the extrusion without discontinuity of sequence.

More particularly, it is provided that such machine sections are made up of components forming internally a chamber according to two circumferences intersecting one another in the longitudinal axis and that such shafts have sections corresponding to the feed sections formed in the manner of screws interacting with one another.

According to another feature of the invention are the shaft sections adjoining the mixing chamber and formed as two rotors, particularly rotors of multi-blade tangential type.

BRIEF DESCRIPTION OF THE DRAWINGS

Above and further objects, features and advantages will become more readily apparent from the following reference being made to the following drawing in which FIG. 1 is a cross-section of the machine along its longitudinal plane;

The second section component 1b is traversed by respective sections of the shafts having a first part 5b' which is formed with a respective pitch smaller than a pitch of the section 5a and with another shaft section 5b". The shaft section 5b" is provided with a respective pitch smaller than the pitch of shaft section 5b'. The shafts further extend in a third section component 1c and a fourth section 1d and are formed with respective shaft sections 5c and 5d. The shaft section 5c has a pitch larger than the pitches of the shaft sections 5b' and 5b". Shaft sections extending through the component 1d have respective pitches 5d' and 5d" wherein the pitch 5d' is equal to the pitch 5b' and the pitch 5d" is equal to the pitch 5b". The same pitches are provided in the shafts which traverse the section components 1e so that pitch 5e is equal to the pitch 5b.

FIG. 2 is a cross-section taken along line II—II of FIG. 1; and

FIG. 3 is a cross-section taken along line III—III of FIG. 1.

SPECIFIC DESCRIPTION

As illustrated in FIG. 1, machine 1 according to the invention includes a series of sections or components 1a, 1b, 1c, 1d, 1e, 1f which are made integral with one another by means of bolts 4 or the like in order to form a single chamber of the desired length.

Such components have a different external form according to the position occupied thereby in the sequence, which each of the forms also determines the different use of the respective sections.

In particular, section or component 1a is provided with an upper hopper 10a for feeding the constituent materials of the compound and component or section 1d is provided with a hopper 10d for adding special fillers as required, while component or section 1e is provided with a hopper 10e fitted with a regulating valve for degassing the compound and, lastly, component or section 1f provides means for attachment to the extrusion head which is shown diagrammatically in broken lines. Within the chamber thus formed are two parallel shafts 5, 6 supported at their left-hand ends by bearings 7 and driven by motors 8 in a manner which is self-evident and is therefore only shown diagrammatically in the figures.

The shafts 5 and 6 are in turn provided with sections of different shapes and cross-sections in order to perform the various operations throughout the route covered by the compound from inlet 10a to outlet 1f.

More particularly, the two shafts are provided with sections 5a, 5b, 5c, 5d and 6c, 6d, etc. corresponding to the sections 1a-1f. The shaft sections are formed as screws of different pitches and generatrices so that their interaction brings about premixing and feeding of the compound.

Shaft sections 5c, 6c (FIG. 2) are shaped instead as a multi-blade rotor of the type interacting tangentially.

Thus machine section 5c corresponding to shaft section 1c, 6c is an effective internal mixer in which a mixing action takes place and is capable of being easily regulated and controlled by suitable means.

At the outlet of mixing chamber there is provided a known regulating means for regulating the opening (cross section) of the chamber. With this configuration the materials fed via hopper 10a are treated by action of the shafts of sections 1a and 1b and at the same time undergo an initial kneading operation before entering section 1c where, through the action of the two rotors 5c, 6c, a true mixing operation takes place under controlled conditions.

During subsequent movement towards the outlet, the compound is further mixed and where necessary filled with additives introduced via hopper 10e and degassed via hopper 10e.

The assembly according to the invention includes single horizontal machine which carries out mixing by means of an effective internal mixer capable of ensuring higher productivity and versatility. Processing parameters which can be easily regulated. The apparatus provides means for accurate control of temperature. At the same time the machine is capable of supplying the extrusion head to which the compound may be fed, following mixing of the raw materials, without discontinuity of sequence due to the need for intermediate phases of loading, unloading and processing.

I claim:

1. An apparatus for processing a thermoplastic compound including a plurality of compound components, said apparatus comprising:

a longitudinally extending housing including first, second, third, fourth, fifth, sixth and seventh housing units rigidly connected in succession, each of said units being formed with a respective inner peripheral wall defining a respective chamber, the chambers of said units forming a continuous passage in said housing;

a pair of interacting parallel shafts traversing said passage and forming respective circumferences overlapping one another, each of said shafts being formed with a respective plurality of shaft sections;

a first hopper on said first housing unit for introducing compound components into a first of said chambers traversed by respective first sections of the shafts adapted to knead the components, each of the first sections being formed as a screw with a large first pitch;

a second chamber of a second housing unit receiving respective second sections of said shafts for premixing the components, each of the second sections extending into a third chamber of the third housing unit and being provided with a first part formed with a respective second pitch smaller than said first pitch and with a respective second part formed with a respective third pitch smaller than said second pitch;

the third chamber of said third housing unit receiving said second parts of said second sections and housing respective third sections of said shafts forming an internal mixer in the third chamber, each of the third sections being provided as a tangential blade-type rotor having a respective elliptical cross-section;

a fourth chamber of the fourth housing unit receiving respective fourth sections of said shafts extending into a fifth chamber of said fifth housing unit, said fourth chamber being formed with a variable cross section connecting said third and fifth chambers;

the fifth chamber of the fifth housing unit being traversed by respective fifth sections of said shafts in the form of screws formed wit respective first parts having a respective pitch generally equal to the pitch of the first parts of the second sections of the shafts and with a respective second part formed with a respective pitch smaller than the pitch of the first part of the fifth section of the shafts, the second parts of the fifth sections of the shafts each being formed with a respective core having a respective plurality of blades extending radially therefrom, each of the blades of one of the shafts being formed with a respective edge reaching adjacent to the core of the other shaft upon rotating of the shafts for further mixing the compound components;

a sixth chamber of the sixth housing unit traversed by respective sixth sections of the shafts, each of the sixth sections being formed with a screw of respective pitch generally equal to the pitch of said first parts of the second section, the sixth sections of the shafts extending into a seventh chamber of the seventh housing unit;

a second hopper on said fifth housing unit for introducing additives to the compound in the fifth chamber;

means for degassing the compound formed on the sixth housing unit and communicating with the sixth chamber;

an extruder head operatively connected with the housing and being in communication with the seventh chamber; and means for regulating said cross section of the fourth chamber.

2. The apparatus defined in claim 1 wherein said housing extends in a horizontal plane.

* * * * *